Sept. 1, 1959  E. WINTER  2,902,621
SUPPLY CATHODE
Filed March 1, 1954
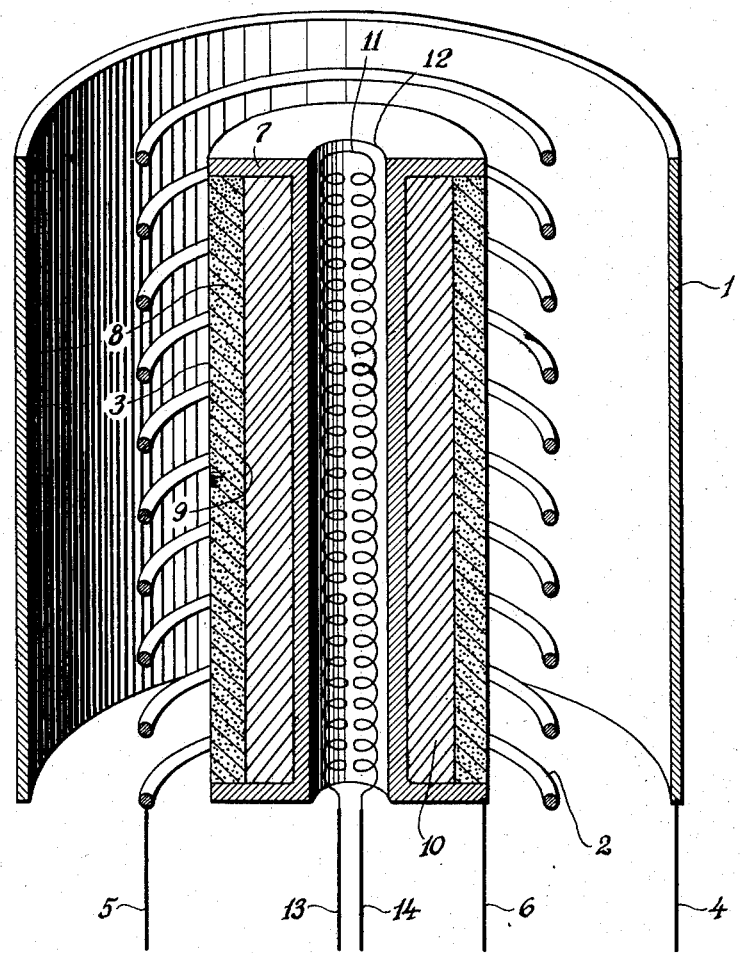
INVENTOR.
ERNŐ WINTER
BY Mock & Blum
ATTORNEYS

United States Patent Office 2,902,621
Patented Sept. 1, 1959

2,902,621

SUPPLY CATHODE

Ernö Winter, Budapest, Hungary, assignor to Egyesült Izzolampa es Villamossagi Reszvenytarsasag, Budapest, Hungary, a firm Application March 1, 1954, Serial No. 429,955

Claims priority, application Hungary March 4, 1953

1 Claim. (Cl. 313—346)

This invention relates to supply cathodes of the type having a container body, a sintered porous body forming a lid for the latter and made of a refractory metal of high melting point, a supply chamber enclosed by the container body and the porous body, the pores of the latter being the only passages from within the supply chamber, and an activating material accommodated within the supply chamber.

With supply cathodes of the above described type it is known to fill the supply chamber with earth alkaline compounds at least one of which consists of a barium compound. It has been suggested, for instance, to accommodate barium oxide and other earth alkaline oxides within the supply chamber. According to another suggestion, the barium oxide has been applied together with reducing substances such as aluminum. Active materials consisting of two different barium alloys the decomposition of one of which being quicker than that of the other are also known. Such active materials are built up e.g. of the alloys or metal compounds of barium and beryllium or barium and aluminum.

The basic idea of the construction of supply cathodes according to which the active material of the cathode is accommodated within a supply chamber of the cathode and diffuses successively onto the surface of a porous body therefrom, proved to be useful and initiated the development of an entirely new type of cathodes which are relatively much less sensitive as to sudden load changes, over-excitations, overheating, etc. Such cathodes work suitably even under extreme operative conditions, as set forth above, since the active material torn off from the cathode surface will immediately be substituted by portions of the supply material from within the cathode chamber. The requirements as to their life-time, however, have not been met with as yet though cathodes of this type have been constructed for more than two decades. Generally, the life-time of such cathodes working e.g. as electrodes of thermionic valves seldom reaches the range of 1000 hours. On the other hand, the lift-time ultimately depends on the rate of evaporation of the barium compounds, particularly on that of barium oxide and is equal to the time during which the barium oxide completely evaporates. The evaporation rate of the barium alloys or barium metal compounds being higher than that of barium oxide, the life-time of cathodes furnished with such active materials is even shorter than that of cathodes with simple barium compounds as active materials.

One object of the present invention consists in improving the above described active materials so as to increase the lifetime of cathodes furnished therewith. Its basic idea aims at decreasing the evaporation rate of the active material below the evaporation rate of mere barium oxide the evaporation rate of which being the smallest among those of the hitherto suggested active materials. The invention is based upon the discovery that a suitable active material can be produced if the barium oxide vapor pressure of the active material is less than the vapor pressure of mere barium oxide. To this purpose—in compliance with the main feature of the invention—the activating material accommodated within the supply chamber of the cathode comprises at least one earth alkaline compound having, at least in activated condition of the cathode, a barium oxide content. In other words, the activating material accommodated within the supply chamber of the cathode has to be composed in such a manner that it contains, at least in its final state, i.e. in the activated condition of the cathode, an amount of barium oxide in the presence of other substances since the barium oxide vapor pressure of the active material be less than the vapor pressure of mere barium oxide only if such other substances are present as well. Obviously, it is quite irrelevant whether the barium oxide is already present in the initial condition of the activating material or only appears upon activation thereof.

Another object of the present invention consists in improving the above said sintered body so as to render the active material associated therewith more effective and to further increase the life-time of the supply cathode.

Other objects and features of the invention will be understood from the following description and claim, reference being taken to the accompanying drawing.

The drawing illustrates a supply cathode formed in compliance with the present invention as a member of a system of electrodes suitable for the use in thermionic valves. Reference numeral 1 refers to a cylinder-shaped anode, reference numeral 2 designates a spirally formed control grid whilst reference numeral 3 indicates the cathode. The supply leads of the electrodes 1, 2, 3 are identified by reference numerals 4, 5, 6, respectively. As represented in the drawing, the cathode 3 comprises an annular container body 7 of U-shaped cross section. The annular space between the web and the legs of the container body is closed by a ring-shaped lid 8 formed by a sintered porous body of refractory metal as hereinafter described. The container body 7 and the lid 8 enclose a likewisely annular or ring-shaped chamber 9 the pores of the porous body forming the lid 8 being the only passages from within the chamber 9, i.e. between the space enclosed by the container body 7 and the lid 8, and the ambient space between the cathode 3 and the anode 1. Within the chamber 9 there is accommodated an activating material 10 the composition of which will hereinafter be described in closer details. With the represented embodiment the activating material 10 fills up the space 9 completely. However, it is possible to have it occupy but a portion of the space 9, as is known to those skilled in the art. Reference numeral 11 indicates the heating spiral of the cathode 3, accommodated within the cylinder-shaped axial hole 12 of the container body 7. The supply leads of the heating spiral 11 are referred to by reference numerals 13 and 14.

As to the composition of the activating material 10, the basic idea of the invention is feasible in many varieties insofar the activating material may preferably consist of 2 barium oxide : 1 strontium oxide : 2 calcium oxide by their molecular weights, or comprise barium beryllate or barium aluminate adapted to yield a barium oxide when activated and to form a composition with a barium oxide content. Furthermore, the activating material may comprise at least one basic refractory barium salt such as barium titanate, barium zirconate, etc., or a basic barium silicate. However, it may comprise at least one barium rare earth salt compound like barium lanthanate, this and all former substances being selected so as to be adapted to yield a barium oxide when activated in the usual manner and to form a composition with a barium oxide content, the barium oxide tension of which being then obviously less than the tension of mere barium oxide. On the other hand, the above mentioned sintered porous body may be made of at least one of the metals tungsten, molybdenum, tantalum and one of the platinum metals, such as platinum, iridium, rhodium and osmium, or of an alloy of nickel with at least one of such metals. All these features of the present invention will come forth more particularly and in closer details from and by the following examples:

*Example 1*

In order to form the activating material of a supply cathode, 2 barium oxide : 1 strontium oxide : 2 calcium oxide by their molecular weights are mixed and activated by heating in the usual manner so as to form a composition of active material, the resulting stuff comprising oxides of barium, strontium and calcium in a molar proportion of 2:1:2, the barium oxide tension of the stuff being obviously less than the tension of mere barium oxide.

Such active materials are, otherwise, described in applicant's British patent specification No. 673,438 for the emissive coating of oxide cathodes for electric discharge tubes.

As is set forth in this prior art, instead of the oxides of the above said earth alkaline metals their carbonates might preferably be used for starting materials as well since the latter decompose, upon heating, to the corresponding oxides. Thus, the active material proper does not contain carbonates as is in compliance with the main feature of the present invention.

*Example 2*

In order to form the activating material of a supply cathode, barium beryllate comprising 1 BaO and 1 BeO by their molecular weights is activated by heating in the usual manner whereupon it yields a composition of barium oxide and beryllium oxide. Thus, the barium oxide tension of the composition is obviously less than the tension of mere barium oxide.

*Example 3*

In order to form the activating material of a supply cathode, barium beryllate comprising 1 BaO and 2 BeO by their molecular weights is activated by heating in the usual manner whereupon it yields a composition of barium oxide and beryllium oxide. Thus, the barium oxide tension of the composition is obviously less than the tension of mere barium oxide.

*Example 4*

In order to form the activating material of a supply cathode, barium beryllate in an amount of 50% by weight comprising 1 BaO and 1 BeO by their molecular weights is added to and mixed with a triple mixture of 2 barium oxide, 1 strontium oxide and 2 calcium oxide by their molecular weights. The mixture is then activated by heating in the usual manner whereupon a composition is yielded containing an additional amount of barium oxide. Thus, the barium oxide tension of the composition is obviously less than the tension of mere barium oxide.

Instead of barium beryllate comprising 1 BaO and 1 BeO by their molecular weights a barium beryllate comprising 1 BaO and 2 BeO by their molecular weights might be applied as well.

*Example 5*

In order to form the activating material of a supply cathode, barium beryllate in an amount of 50% by weight comprising 1 BaO and 1 BeO by their molecular weights is added to and mixed with a double mixture of earth alkaline oxides comprising 50% BaO and 50% SrO by weight. The mixture is then activated by heating in the usual manner whereupon a composition is yielded having an additional amount of barium oxide. Thus, the barium oxide tension of the composition is obviously less than the tension of mere barium oxide.

*Example 6*

In order to form the activating material of a supply cathode, barium beryllate in an amount of 50% by weight comprising 1 BaO and 1 BeO by their molecular weights is added to and mixed with a double mixture of earth alkaline oxides comprising 50% BaO and 50% CaO by weight. The mixture is then activated by heating in the usual manner whereupon a composition is yielded having an additional content of barium oxide. Thus, the barium oxide tension of the composition is obviously less than the tension of mere barium oxide.

*Example 7*

In order to form the activating material of a supply cathode, barium aluminate comprising 3 BaO and 1 $Al_2O_3$ by their molecular weights is activated by heating in the usual manner whereupon it yields a composition having a barium oxide content. Thus, the barium oxide tension of the composition is obviously less than the tension of mere barium oxide.

*Example 8*

In order to form the activating material of a supply cathode, an amount of 50% by weight of barium aluminate is added to and mixed with an amount of 50% by weight of barium beryllate, comprising 1 BaO and 1 BeO by their molecular weights. The mixture is then activated by heating in the usual manner whereupon it yields a composition having a content of barium oxide. Thus, the barium oxide tension of the composition is obviously less than the tension of mere barium oxide.

Instead of barium beryllate comprising 1 BaO and 1 BeO by their molecular weights a barium beryllate comprising 1 BaO and 2 BeO by their molecular weights might be applied as well.

*Example 9*

In order to form the activating material of a supply cathode, barium aluminate comprising 3 BaO and 1 $Al_2O_3$ by their molecular weights is added to and mixed with calcium aluminate and the amounts are selected so that the molar proportion of barium aluminate and calcium aluminate be 1:1. The mixture is then activated by heating in the usual manner whereupon it yields a composition having a barium oxide content. Thus, the barium oxide tension of the composition is obviously less than the tension of mere barium oxide.

*Example 10*

In order to form the activating material of a supply cathode, barium lanthanate comprising 3 BaO and 1 $La_2O_3$ by their molecular weights is activated by heating in the usual manner whereupon it yields a composition having a barium oxide content. Thus, the barium oxide tension of the composition is obviously less than the tension of mere barium oxide.

Instead of an earth alkaline compound containing lanthanum earth alkaline compounds containing another rare earth metal such as scandium might be applied with similar results.

Likewise, instead of applying a single barium lanthanate compound a mixture of 50% by weight of such a barium compound and of 50% by weight of barium beryllate comprising 1 BaO and 1 or 2 BeO by their molecular weights might be used as well.

*Example 11*

In order to form the activating material of a supply cathode, a basic refractory barium salt such as barium titanate having the formula $BaTiO_3$ in an amount of 40% by weight is added to and mixed with a mixture of 50% by weight of BaO, 30% by weight of SrO and 20% by weight of CaO, the three latters forming a triple mixture of oxides well known in the art of manufacturing oxide cathodes. The mixture is then activated by heating in the usual manner whereupon it yields a composition having an additional amount of barium oxide. Thus, the barium oxide tension of the composition is obviously less than the tension of mere barium oxide.

The proportion of the barium titanate in the above mixture may vary within the range of 10% to 90%. Moreover, the titanium may wholly or partly be substituted by zirconium.

*Example 12*

In order to form the activating material of a supply cathode, 30% by weight of a basic refractory barium salt such as barium titanate of the formula BaTiO$_3$ is added to and mixed with 70% by weight of a double mixture comprising 60% by weight of BaO and 40% by weight of SrO. The mixture is then activated by heating in the usual manner whereupon it yields a composition having a barium oxide content. Thus, the barium oxide tension of the composition is obviously less than the tension of mere barium oxide.

The proportion of the barium titanate in the above mixture may vary within the range of 10% to 90%. Moreover, the titanium may wholly or partly be substituted by zirconium.

*Example 13*

In order to form the activating material of a supply cathode, 30% by weight of a basic refractory barium salt such as barium titanate of the formula BaTiO$_3$ is added to and mixed with 70% by weight of a double mixture comprising 60% by weight of BaO and 40% by weight of CaO. The mixture is then activated by heating in the usual manner whereupon it yields a composition having a barium oxide content. Thus, the barium oxide tension of the composition is obviously less than the tension of mere barium oxide.

The proportion of the barium titanate in the above mixture may vary within the range of 10% to 90%. Moreover, the titanium may wholly or partly be substituted by zirconium.

*Example 14*

In order to form the activating material of a supply cathode, barium titanate of the formula Ba$_2$TiO$_4$ is activated by heating in the usual manner whereupon it yields a composition having a barium oxide content. Thus, the barium oxide tension of the composition is obviously less than the tension of mere barium oxide.

The titanium may wholly or partly be substituted by zirconium.

*Example 15*

In order to form the activating material of a supply cathode, an amount of 70% by weight of a basic barium silicate such as BaSiO$_3$ is added to and mixed with an amount of 30% by weight of a mixture of 2 BaO, 1 SrO and 2 CaO by their molecular weights. The mixture is then activated by heating in the usual manner whereupon it yields a composition having an additional content of barium oxide. Thus, the barium oxide tension of the composition is obviously less than the tension of mere barium oxide.

The proportion of the basic barium silicate may vary within the range of 70% to 90% by weight.

*Example 16*

In order to form the activating material of a supply cathode, an amount of 70% by weight of a basic barium silicate such as BaSiO$_3$ is added to and mixed with a double mixture consisting of an amount of 70% by weight of BaO and 30% by weight of SrO. The mixture is then activated by heating in the usual manner whereupon it yields a composition having an additional content of barium oxide. Thus, the barium oxide tension of the composition is obviously less than the tension of mere barium oxide.

Instead of SrO in the above double mixture CaO may be used with like results.

*Example 17*

In order to form the activating material of a supply cathode, an amount of 80% by weight of a basic barium silicate such as Ba$_2$SiO$_4$ is added to and mixed with an amount of 15% by weight of a triple mixture containing 2 BaO, 1 SrO and 2 CaO by their molecular weights. The mixture is then activated by heating in the usual manner whereupon it yields a composition having an additional content of barium oxide. Thus, the barium oxide tension of the composition is obviously less than the tension of mere barium oxide.

The proportion of the basic barium silicate may vary within the range of 70% to 90% by weight.

*Example 18*

In order to form the activating material of a supply cathode, an amount of 90% by weight of a basic barium silicate such as Ba$_2$SiO$_4$ is added to and mixed with an amount of 10% by weight of a double mixture consisting of an amount of 40% by weight of BaO and of 60% by weight of SrO. The mixture is then activated by heating in the usual manner whereupon it yields a composition having an additional amount of barium oxide. Thus, the barium oxide tension of the composition is obviously less than the tension of mere barium oxide.

Instead of a SrO content of the above double mixture a corresponding amount of CaO may be applied as well.

*Example 19*

In order to form the activating material of a supply cathode, a basic barium silicate such as BaSiO$_3$ is added to and mixed with a strontium silicate such as SrSiO$_3$ and a calcium silicate such as CaSiO$_3$ the proportions being selected so that the molar proportion be 2:1:2. The mixture is then activated by heating in the usual manner whereupon it yields a composition having a barium oxide content. Thus, the barium oxide tension of the composition is obviously less than the tension of mere barium oxide.

*Example 20*

In order to form the activating material of a supply cathode, a barium silicate such as Ba$_2$SiO$_4$, a strontium silicate such as Sr$_2$SiO$_4$ and a calcium silicate such as Ca$_2$SiO$_4$ are mixed with one another, the proportions being selected so that the molar proportion be 2:1:2. The mixture is then activated by heating in the usual manner whereupon it yields a composition having a barium oxide content. Thus, the barium oxide tension of the composition is obviously less than the tension of mere barium oxide.

According to test results supply cathodes furnished with the above described active materials manifest a considerably longer life-time in comparison with like cathodes hitherto known. The life-time of the former proved to be thrice or four times as great as that of the latter.

It has been found that a considerable further increase of the life-time of the above described improved cathodes can be obtain if the porous body forming the lid 8 is made of at least one of the metals tungsten, molybdenum, tantalum or the platinum metals such as platinum, iridium, rhodium, osmium or of an alloy of nickel therewith. Such an association of the above described active materials to wit the substance 10 and the sintered porous body that is the lid 8 resulted in life-times which are ten to twenty times as great as the life-time of the cathodes hitherto known.

What I claim is:

A structure adapted to constitute a supply cathode comprising a metallic container body, a sintered porous body forming a lid for said container body and made of a refractory metal having a melting point higher than that of nickel, said container body and said porous body enclosing a supply chamber, the pores of said porous body forming the only passages from within said chamber, a supply material within said chamber, adapted to work as an active material of said supply cathode and to coact with the porous lid, said supply material consisting of a triple mixture of barium oxide, strontium oxide and calcium oxide in the molar ratio of 2:1:2, the barium oxide vapor pressure of said material when activated being less than the vapor pressure of pure barium oxide.

References Cited in the file of this patent

UNITED STATES PATENTS

| | | |
|---|---|---|
| 2,071,973 | Francis | Feb. 23, 1937 |
| 2,121,589 | Espe | June 21, 1938 |
| 2,492,142 | Germeshausen | Dec. 27, 1949 |
| 2,543,728 | Lemmens | Feb. 27, 1951 |
| 2,673,277 | Lemmens | Mar. 23, 1954 |
| 2,750,527 | Katz | June 12, 1956 |